US011860855B1

(12) United States Patent
Jacques de Kadt et al.

(10) Patent No.: US 11,860,855 B1
(45) Date of Patent: Jan. 2, 2024

(54) STORAGE SERVICE SUPPORTING DATA TRANSFORMATIONS

(71) Applicant: Amazon Technologies, Inc., Seattle, WA (US)

(72) Inventors: Christopher Richard Jacques de Kadt, Seattle, WA (US); Tate Andrew Certain, Seattle, WA (US); Douglas Stewart Laurence, Mercer Island, WA (US); Phil Simko, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 377 days.

(21) Appl. No.: 15/632,260

(22) Filed: Jun. 23, 2017

(51) Int. Cl.
*G06F 16/23* (2019.01)
*G06F 16/22* (2019.01)

(52) U.S. Cl.
CPC .......... *G06F 16/2379* (2019.01); *G06F 16/22* (2019.01)

(58) Field of Classification Search
CPC .................. G06F 16/2379; G06F 16/22
See application file for complete search history.

(56) References Cited

U.S. PATENT DOCUMENTS

| | | | |
|---|---|---|---|
| 7,716,180 B2 | 5/2010 | Vermeulen et al. | |
| 8,041,946 B2 * | 10/2011 | Bunn | H04L 63/0281 713/153 |
| 9,003,086 B1 * | 4/2015 | Schuller | G06F 3/0665 710/62 |
| 9,507,787 B1 * | 11/2016 | Bono | G06F 16/13 |
| 2003/0149791 A1 * | 8/2003 | Kane | H04L 67/327 709/246 |
| 2005/0246204 A1 * | 11/2005 | Simon | G16H 40/67 705/2 |
| 2005/0273721 A1 * | 12/2005 | Yantis | G06F 16/258 715/762 |
| 2006/0195489 A1 * | 8/2006 | Cesare | G06F 16/215 |
| 2007/0204337 A1 * | 8/2007 | Schnackenberg | H04L 63/105 726/13 |
| 2012/0079175 A1 * | 3/2012 | Flynn | G11C 7/1012 711/103 |

(Continued)

OTHER PUBLICATIONS

U.S. Appl. No. 15/444,128, filed Feb. 27, 2017, Brannon Mason, et al.

(Continued)

*Primary Examiner* — Hosain T Alam
*Assistant Examiner* — Anthony G Gemignani
(74) *Attorney, Agent, or Firm* — Alexander A. Knapp; Kowert, Hood, Munyon, Rankin & Goetzel, P.C.

(57) ABSTRACT

A storage service is configured to receive one or more instructions specifying transformations that are to be applied to data sets stored by the storage service when the data sets are made available outside of particular storage locations within the storage service. In response to triggering events that make the data sets available outside of the particular storage locations, the storage services causes the transformations to be performed on the data sets prior to the data sets being accessible at one or more destination locations outside of the particular storage locations where the data sets are stored. In some embodiments, the transformations are performed on hardware included in the storage service or are performed on external hardware at the direction of the storage service.

19 Claims, 9 Drawing Sheets

(56) References Cited

U.S. PATENT DOCUMENTS

| | | | | |
|---|---|---|---|---|
| 2012/0130973 | A1* | 5/2012 | Tamm | G06F 16/2471 707/706 |
| 2013/0091452 | A1* | 4/2013 | Sorden | G06T 17/05 715/771 |
| 2014/0258715 | A1* | 9/2014 | Rodniansky | G06F 21/6227 713/162 |
| 2014/0304825 | A1* | 10/2014 | Gianniotis | G06F 21/6254 726/26 |
| 2015/0058382 | A1* | 2/2015 | St. Laurent | G06F 16/188 707/823 |
| 2015/0269276 | A1* | 9/2015 | George | G06F 16/211 707/803 |
| 2015/0324459 | A1* | 11/2015 | Chhichhia | G06N 7/02 706/12 |
| 2016/0034530 | A1* | 2/2016 | Nguyen | G06F 16/2471 707/719 |
| 2017/0090895 | A1* | 3/2017 | Demiroski | G06F 8/60 |
| 2017/0139979 | A1* | 5/2017 | Naryzhnyy | G06F 16/213 |

OTHER PUBLICATIONS

U.S. Appl. No. 15/587,283, filed May 4, 2017, Yuanyuan Yue.
U.S. Appl. No. 14/222,103, filed Mar. 21, 2014, Ghidireac, et al.
U.S. Appl. No. 14/947,977, filed Nov. 20, 2015, Jacob Shannan Carr.

\* cited by examiner

STORAGE SERVICE SUPPORTING DATA TRANSFORMATIONS

BACKGROUND

The advent of virtualization technologies for commodity hardware has provided benefits with respect to managing large-scale computing and storage resources for many clients with diverse needs, allowing various computing and storage resources to be efficiently and securely shared by multiple clients. For example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

In some circumstances, users of a virtualized data store may desire to share or otherwise make available data outside of a particular logical data store at which the data is stored. Also, in some situations users may desire to modify or exclude some data stored in a particular logical data store before sharing it outside of the particular logical data store. However, modifying data stored in a virtualized data store before sharing the data may be difficult and costly.

Figure 1:
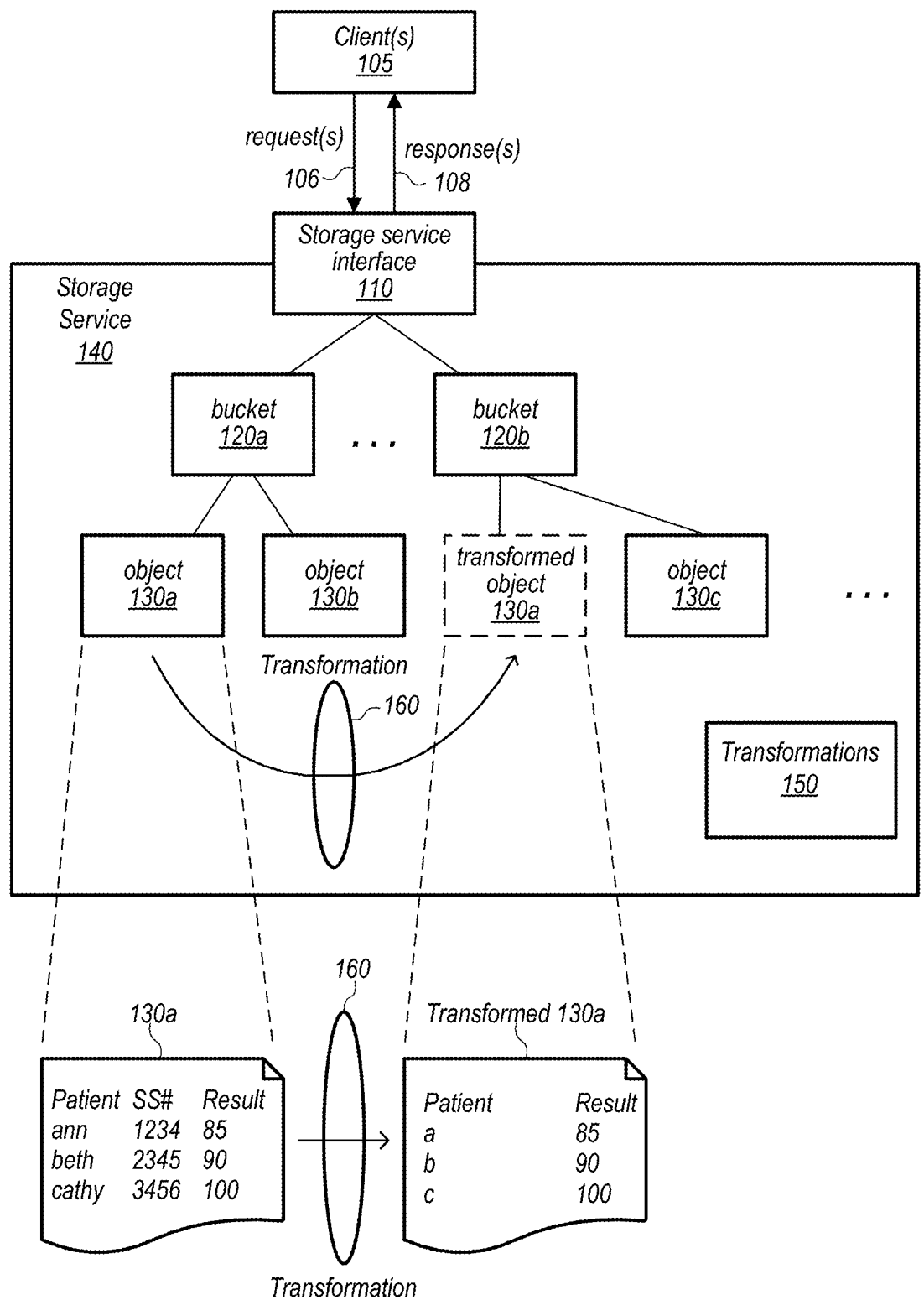
FIG. 1 illustrates a distributed data storage service configured to perform data transformations, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for providing a distributed data storage service that automatically performs data transformation is described herein. According to some embodiments, a system includes a distributed data storage service. The distributed data storage service includes multiple physical storage devices configured to store multiple data objects for clients of the distributed data storage service in logical storage locations. For example, a logical storage location may be implemented on multiple ones of the physical storage devices or a single physical storage device. Also, for example, a physical storage device may implement portions of multiple logical storage locations and different ones of the logical storage locations may be allocated to different clients of the distributed data storage service. The distributed data storage service also includes one or more computing devices configured to receive instructions specifying one or more transformations to be applied for one or more data objects stored in a particular logical storage location when data representing the one or more data objects is made available outside of the particular logical storage location. The one or more computing devices of the distributed data storage service are also configured to, in response to an event causing data representing the one or more data objects stored in the particular logical storage location to be made available outside of the particular logical storage location, automatically cause the one or more transformations to be performed prior to the data being made available outside of the particular logical storage location. The one or more transformation may be any process that takes on or more of the data sets stored in the particular storage location as an input and provides an altered version of the one or more data sets stored in the particular storage location as an output of the transformation. For example, a transformation may filter data in a data set, redact data in a data set, obfuscate information in a data set, add data to a data set, encrypt a data set, concatenate information of a data set or data sets, de-concatenate information of a data set or data sets, extract a subset of data from a data set, perform a computation based on data in a data set and return results, or involve various other pre-defined or user-defined operations.

According to some embodiments, a method includes receiving, by a storage service storing a plurality of data sets in a plurality of storage locations, instructions specifying one or more transformations that are to be applied for one or more data sets stored in a particular storage location of the storage service when data representing the one or more data sets stored in the particular storage location is made available outside of the particular storage location. The method also includes automatically performing, by the storage service, prior to making data representing the one or more data sets available outside of the particular storage location, the one or more transformations.

According to some embodiments, a non-transitory computer-readable storage medium stores program instructions that, when executed by a computing device of a storage service, cause the computing device to receive instructions specifying one or more transformations that are to be applied for one or more data sets stored in a particular storage location of the storage service when data representing the one or more data sets is made available outside of the particular storage location; and prior to making data representing the one or more data sets available outside of the particular storage location, cause the one or more transformations to be performed.

Distributed storage systems often include an interface that allows users of the distributed storage system to store data in the distributed storage system and retrieve data stored in the distributed storage system. Some distributed storage systems may further store metadata along with stored data sets, such as metadata including a time-stamp indicating when a data set was last stored or accessed. However, in such distributed storage systems, if a user desires to transform data stored in the distributed storage system, the user is required to retrieve the data stored in the distributed storage system via the interface of the distributed storage system, transform the data using an outside computing resource, and then store the transformed data back in the distributed storage system. Such an approach may be time consuming and difficult to manage for users of a distributed storage system. Furthermore, such an approach may be expensive in terms of resource consumption. For example, if transformations are to be performed on a large quantity of data sets stored in a distributed storage system, considerable network resources may be consumed transmitting data sets across a network of the distributed storage system to an interface of the distributed storage system, transmitting the data sets from the interface of the distributed storage system to computing resources that perform the transformations, transmitting the transformed data sets from the computing resources back to the interface of the distributed storage system, and transmitting the transformed data sets across the network of the distributed storage system to a new storage location in the distributed storage system.

Also, in such distributed storage systems, performing transformations may be logistically complicated for users of the distributed storage system and/or for an operator of the distributed storage system. For example, different users of a distributed storage system may choose to have transformations performed on multiple types of computing resources with different interfaces, such that a user or an operator of the distributed storage system may be required to develop customized solutions for each different user to support differences in interfaces between an interface of the computing resources performing the transformations and an interface of the distributed storage system. Also, some users of a distributed storage system may not be large enough to justify automating the performance of transformations, thus these users may manually execute transformations on data retrieved from a distributed storage system. For example, a human operator may be required to open a data set and manually remove data that is not desired to be shared.

In some embodiments, a distributed data storage service with event triggered transformations may allow a user or client of the distributed data storage service to define or select one or more transformation that are to be applied to data stored in particular storage locations of the distributed data storage service. The transformations may be applied when the data is made available outside of the particular storage location. A user or client may also specify different triggering events to trigger different transformations that are to be applied to data stored in the particular storage location. For example, triggering events may include the data being made available outside of the particular storage location. For example, if data stored in a particular storage location is to be copied to a particular destination location a first user-defined or user-selected transformation may be applied and if data stored in the particular storage location is to be copied to a different particular destination location, a different user-defined or user-selected transformation may be applied.

In some embodiments, a distributed data storage service may manage execution of user-defined or user-selected transformations in response to defined triggering events without any user interaction subsequent to defining or selecting the transformations that are to be applied. For example, a user or client may store data in a particular storage location, and may also specify a transformation to be applied that is associated with the particular storage location that removes sensitive data from the data set any time the data set or a portion of the data set is made available outside of the particular storage location. Once the transformation is defined or selected and associated with the particular storage location, a data storage service may cause the transformation to be performed on data being made available outside of the particular storage location each time the data is made available outside of the particular storage location. Thus, the user does not need to manage transforming the data each time it is shared.

Furthermore, in some embodiments, hardware resources such as field programmable gate arrays (FPGAs), reduced instruction set computer (RISC) processors, or other suitable types of processors may be distributed throughout a distributed data storage service such that respective ones of the processors are located proximate to respective sets of physical storage devices that store data sets in particular storage locations of the distributed data storage service. Thus, transformations may be performed locally within a distributed data storage service, which may reduce network traffic as compared to transformations that are performed outside of the distributed data storage service.

Also, in some embodiments, a distributed data storage service may be part of a larger provider network that offers additional services in addition to data storage services. For example, a provider network may also offer computing services in addition to data storage services. In such embodiments, a distributed data storage service may perform transformations using hardware included in the distributed data storage service or may manage coordination with another service of the provider network, such as a computing service, to automatically perform transformations on data being made available outside of a particular storage location using hardware resources of the other service of the provider network. For example, the distributed data storage service may recognize that a triggering event has taken place and may coordinate with a computing service to provision a computing resource of the computing service to execute a transformation stored by the distributed data storage service and assigned to be applied to data being made available outside of a particular storage location. The distributed data storage service may coordinate with the computing service to perform the transformation using the provisioned computing resource. The distributed data storage service may then provide a transformed version of the data stored in the particular storage location outside of the particular storage location, wherein the transformed version of the data has been transformed according to an assigned transformation for the particular storage location. In such embodiments, no user interaction may be required to execute a transformation in response to a triggering event once the transformation is assigned to be performed for data made available from a particular storage location. Also, in such embodiments, multiple services of the provider network, such as a distributed data storage service and computing service, may be implemented on physical resources that are geographically proximate to one another, for example in a same data center. Thus, network traffic may be reduced in such embodiments as compared to transformations being managed by a user outside of a data storage service.

In some embodiments, multiple transformations may be assigned to be performed for data sets stored in a particular storage location when made available outside of the particular storage location. For example, in some embodiments, different transformations may be assigned when data is being made available at different destination locations. For example, if data is moved to another storage location within an a same account of a client of a distributed data storage service, a first transformation may be applied, and if data is moved to a storage location outside of the client's account, a different transformation may be applied. As discussed in more detail below, transformations to be applied to data being made available outside of a particular storage location of a distributed data storage service may be defined in many ways and may be automatically performed by a distributed data storage service in response to a variety of triggering events.

In some embodiments, event triggered data transformations may be automatically performed by various types of distributed data storage systems. For example, an object based distributed data storage system may be configured to automatically perform event triggered data transformations when an object is made available outside of a given storage location. Also, other types of distributed data storage systems, such as block storage systems, relational database data storage systems, file-structured storage systems, and other various types of distributed data storage systems may be configured to automatically perform event triggered data transformations.

In some embodiments, an event triggered data transformation may be user-defined or may be selected by a user from a set of pre-defined transformations. For example, in some embodiments, a user may submit a transformation that is to be applied to data made available from a particular storage location or may select an already defined transformation from a set of transformations. Some example transformations that may be applied include, but are not limited to:

Filtering at least some data out of data stored in a particular storage location;
Redacting at least some information from a document stored in a particular storage location;
Obfuscating at least some information in a document stored in a particular storage location;
Adding a watermark to a document stored in a particular storage location;
Adding information such as a date or time of access to a document stored in a particular storage location;
Encrypting at least some data being made available outside of a particular storage location with a client's particular encryption key;
Enforcing a data privacy policy by removing or redacting data;
Concatenating documents stored in a particular storage location;
De-concatenating data stored in a particular storage location. For example, de-concatenating data may include splitting an indexed table into separate tables. Also in some embodiments, different transformed data sets may be made available for different destination locations. For example, if a transformation causes a table to be split, a first split portion may be made available at first destination location and another split portion may be made available at another destination location;
Extracting portions of a video that include motion, for example from a surveillance video;
Performing a computation, aggregation, or calculation based on the data stored in the particular storage location and providing the result with the data or providing the result without providing the data stored in the particular storage location;
Performing user provided transformations; or
Performing various other types of transformations.

Figure 2:
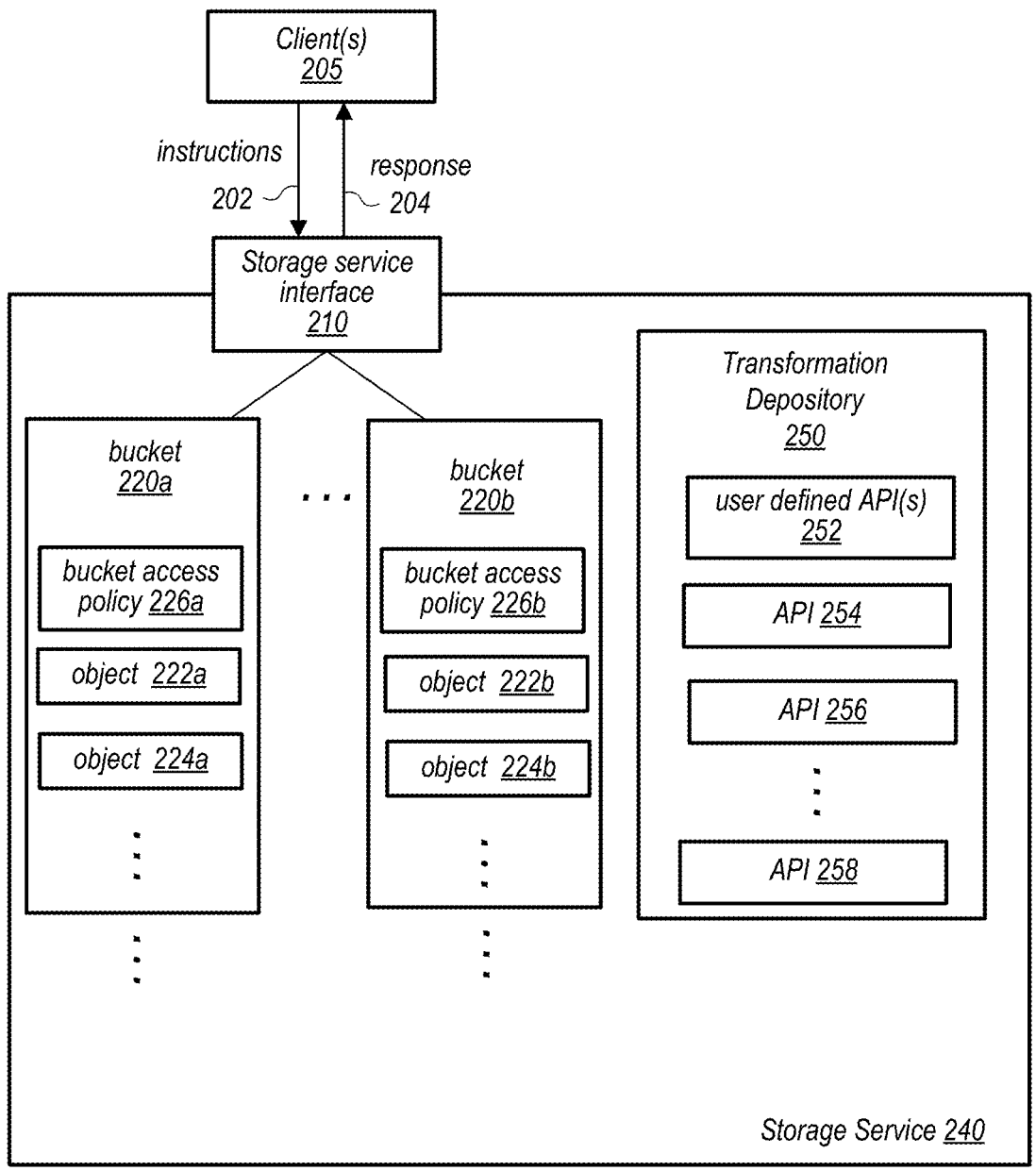
FIG. 2 illustrates a more detailed view of a distributed data storage service configured to perform data transformations, according to some embodiments.
Figure 3:
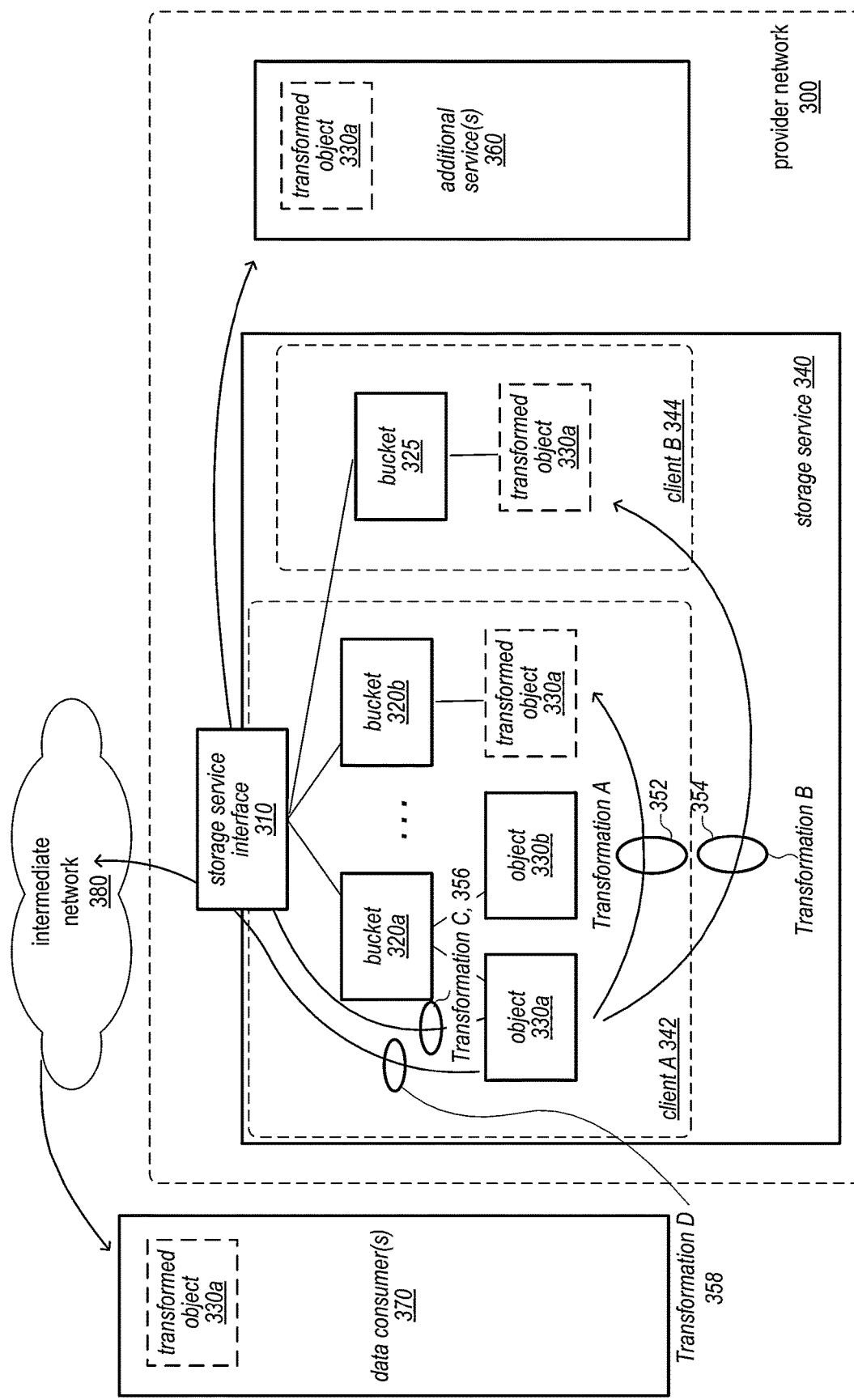
FIG. 3 illustrates a provider network including a storage service configured to perform data transformations and including additional services, according to some embodiments.

FIGS. 1-3 illustrate distributed data storage services configured to perform data transformations, according to some embodiments. While FIGS. 1-3 are described in terms of an object-based distributed data storage service, it should be noted that various other types of distributed data storage services, such as block storage systems, relational database data storage systems, file-structured storage systems, and other various types of distributed data storage systems may be configured to automatically perform event triggered data transformations. Thus FIGS. 1-3 should not be interpreted as limiting in scope but instead should be interpreted as providing an example implementation of a distributed data storage system configured to perform data transformations out of several other possible implementations of a distributed data storage system configured to perform data transformations included within the scope of Applicant's disclosure.

An example distributed data storage service, configured to perform transformations, based on an object storage model for providing virtualized storage resources to clients as a service, such as a web service, is illustrated in FIG. 1. In the illustrated model, storage service interface 110 is provided as a client-facing interface to storage service 140. Storage service interface 110 may, for example, be implemented as, or alternatively may include, an application programming interface (API). According to the model presented to client 105 by interface 110, the storage service may be organized as an arbitrary number of logical storage locations, such as buckets 120*a* and 120*b* through 120*n*, accessible via interface 110. Each bucket 120 may be configured to store an arbitrary number of objects 130*a*, 130*b*, 130*c* through 130*n*, which in turn may store data specified by client 105 of the storage service 140. One or more clients 105 may submit requests 106 to the storage service interface to store data objects, retrieve data objects, and, as described in more detail below, assign one or more transformations to be performed when data objects are made available outside of a particular storage location. Storage service interface 110 may provide responses 108 to the requests, which may include acknowledgements and/or retrieved data, for example. Generally, in addition to storage and retrieval of data objects, the requests or commands that the storage service 140 may perform may include commands that cause data transformations to be performed within the storage service 140, such as command to move, copy, read, download, etc. data stored in the storage service 140. In this way, the clients 105 are not burdened with removing the data from the storage service 140, performing the transformations, and then returning the transformed data to the storage service.

This configuration may save network bandwidth and processing resources for the clients 105, for example.

In some embodiments storage service interface 110 may be configured to support interaction between the storage service 140 and its client(s) 105 according to a web services model. For example, in one embodiment, interface 110 may be accessible by clients as a web services endpoint having a Uniform Resource Locator (URL) to which web services calls generated by service clients may be directed for processing. Generally speaking, a web service may refer to any type of computing service that is made available to a requesting client via a request interface that includes one or more Internet-based application layer data transport protocols, such as a version of the Hypertext Transport Protocol (HTTP) or another suitable protocol.

In at least some embodiments, the object storage service 140 may be configured to internally replicate data objects for data redundancy and resiliency purposes.

Storage service 140 also stores transformations 150. Transformations 150 may be pre-defined transformations offered by storage service 140 for selection by users of the storage service, such as clients 105. The users may select one or more of the pre-defined transformations to be applied to data stored in particular storage locations, such as particular ones of buckets 120, when the data stored in the buckets, such as ones of objects 130, are made available outside of the particular respective storage locations, for example buckets 120. Also, in some embodiments, transformations 150 may include user-defined transformations submitted by users of storage service 140. The user-defined transformations may be submitted as excerpts of code that are to be executed in response to particular triggering events, such as an object 130 stored in a particular bucket 120 being made available outside of the particular bucket 120.

In some embodiments, a storage service 140 may include transformation engines implemented on hardware included in the storage service that perform transformations 150 in response to a triggering event. Also, in some embodiments, a storage service 140 may coordinate with another service, such as a computing service to perform transformations 150 in response to a triggering event.

For example, FIG. 1 shows object 130a being made available outside of bucket 120a. For example, object 130a may be moved or copied to bucket 120b. Also, client 105 may have assigned transformation 160 to be applied to objects made available outside of bucket 120a. For example, transformation 160 may be a user-selected or a user-defined transformation included in transformations 150. In response to determining that object 130a is to be made available outside of bucket 120a, storage service 140 may invoke transformation 160 to be performed on data representing object 130a prior to moving object 130a or copying object 130a to bucket 120b. For example, object 130a may be a document including patient names, social security numbers, and test results. Transformation 160 may include instructions to obfuscate patient names and filter out social security numbers. Thus, a transformed object 130a that has been transformed by performing transformation 160 may obfuscate patient names and may not include patient social security numbers, but may still include patient test results. For example, transformed object 130a includes test results for patients "a, b, and c," whereas object 130a (prior to being transformed) includes the names "Ann, Beth, and Cathy" and also includes the patients' respective social security numbers.

In the example described in FIG. 1, client 105 may select or define transformation 160. The selected or user-defined transformation, for example transformation 160, may be applied to objects stored in bucket 120a each time one of the objects stored in bucket 120a is made available outside of bucket 120a. For example, storage service 140 may automatically perform transformation 160 on any object stored in bucket 120a prior to making the object available outside of bucket 120a. Thus client 105 does not need to manually remove patient names or social security numbers when sharing data stored in bucket 120a and can instead rely on storage service 140 to automatically transform any data stored in bucket 120a such that patient names are obfuscated and patient social security numbers are removed. This may be true even if additional records with additional patient names and social security numbers are added to or removed from object 130a or bucket 120a. As described above, various types of transformations may be applied on data sets being made available outside of a particular storage location and obfuscating names and removing social security numbers are given only as example transformations that may be applied from among many possible transformations that may be applied.

FIG. 2 illustrates a more detailed view of a distributed data storage service configured to perform data transformations, according to some embodiments. For example, storage service 240 illustrated in FIG. 2 may be the same storage service as storage service 140 illustrated in FIG. 1.

In some embodiments, a user of a distributed data storage service configured to automatically perform data transformations, may submit instructions specifying one or more transformations to be applied for one or more data objects stored in a particular logical storage location of the distributed data storage service. For example, client 205 may submit instructions 202 specifying transformations to be applied for objects stored in a particular bucket, such as bucket 220a or 220b. In some embodiments, the instructions may be submitted via an interface of the distributed data storage service, such as via storage service interface 210. In response to receiving the instructions, a distributed data storage service, such as storage service 240, may provide a response, such as response 204, indicating that the instructions have been received and/or enacted for the particular storage location.

In some embodiments, a client, such as client 205, may submit instructions, such as instructions 202, programmatically via an interface of a distributed data storage service, such as storage service interface 210. Also, in some embodiments, a storage service, such as storage service 240, may provide a graphical user interface (GUI) through which a client, such as client 205, may submit instructions specifying one or more transformations to be applied for one or more data objects stored in a particular logical storage location.

In some embodiments, the instructions specifying the one or more transformations to be applied for the one or more data objects stored in the particular logical storage location may include user-defined transformations, such as code excerpts included in the instructions, or may include an indication of one or more pre-defined transformations that are stored by a distributed data storage service, such as storage service 240, that are to be applied to the one or more data objects stored in the particular storage location when the one or more objects are made available outside of the particular storage location.

In some embodiments, user-defined and/or pre-defined transformations may be stored in a transformation depository, such as transformation depository 250, of a distributed data storage service, such as storage service 240. In some embodiments, multiple transformation depositories may be stored in local storage locations of a distributed data storage service, which are local to storage locations for which the transformations are to be applied. Also, in some embodiments, a transformation depository may be more centrally stored in a distributed data storage service and may store transformations that are to be applied at various storage locations within the distributed data storage service.

In some embodiments, transformations may be implemented as application program interfaces (APIs) behind a storage service interface, such as storage service interface 210. For example, an object being retrieved from a certain logical storage location, such as bucket 220a or 220b, may be passed through one or more transformations represented by one or more APIs, such one or more of APIs 252, 254, 256, or 258, before being presented to a storage service interface, such as storage service interface 210, to be delivered to a destination location outside of a storage service, such as storage service 240. Also, for destination locations within a distributed data storage service, such as storage service 240, an object in a particular storage location, for example object 222a, may be passed through one or more APIs, such as one or more of APIs 252, 254, 256, or 258, before being copied or moved to another storage location (e.g., object 222b, object 224b) in the distributed data storage service, such as bucket 220b.

In some embodiments, each storage location, such as each of buckets 220 may include an access policy, such as bucket access policies 226a and 226b. The access policies may define which transformations are to be applied for certain objects stored in the storage location when being made available at particular destination locations outside of the respective storage location. For example, bucket access policy 226a may specify that when object 222a is made available (for example moved or copied) to bucket 226b, the object is to pass through API 254 to create a transformed version of object 222a that will be available at bucket 220b. In some embodiments, a bucket access policy may indicate different transformations are to be applied to objects stored in a given bucket when being made available at different destination locations. In some embodiments, an access policy may be updated in response to receiving instructions specifying one or more transformations that are to be applied for one or more data sets stored in a particular storage location of the storage service. For example, bucket access policy 226a may be updated in response to instructions 202 specifying a particular transformation corresponding to a particular one of APIs 252, 254, 256, or 258 is to be applied when data stored in bucket 220a is made available at particular destination locations outside of bucket 220a.

In some embodiments, APIs corresponding to assigned transformations may be destination specific or general. For example, an API stored in transformation depository 250, such as API 252, may define both a transformation and a destination location for a transformed object where the transformed version of the object is to be delivered. Also, an API stored in a transformation depository, such as API 252, may be general and define a transformation, wherein the API is generic to multiple destination locations.

In some embodiments, instead of a transformation being applied to data "leaving" a particular storage location, a transformation may be applied to data being added to a particular storage location. For example, bucket 220b may include bucket access policy 226b that specifies that all incoming objects must pass through API 258 before being added to bucket 220b. As an example, API 258 may be a virus scan that scans incoming objects that are to be added to bucket 220b for viruses. Other examples may include a bucket access policy that requires incoming objects to be encrypted with a particular encryption key, wherein one of the APIs stored in transformation depository 250 is configured to encrypt data objects with the particular encryption key, which may be a customer defined encryption key. In some embodiments, an API, such as one of the APIs stored in transformation depository 250, may reject an incoming object that is to be added to a particular storage location, such as bucket 220b, for example if a virus scan shows viruses. In response to an object being rejected, a storage service, such as storage service 240, may issue a message, such as a message indicating that bucket 220b will not accept the object.

In some embodiments, APIs stored in a transformation depository, such as transformation depository 250, may include both pre-defined APIs and user-defined APIs. For example, instructions 202 may include a user defined API, such as a user-specific encryption key that is to be applied, and a pre-defined API, such as a virus scan. The user-defined API may be added to the transformation depository and instructions to invoke the user-defined API for certain triggering events may be added to an access policy for a particular storage location. In the case of a pre-defined API, instructions to invoke an API already stored in the transformation depository for certain triggering events may be added to an access policy for a particular storage location.

In some embodiments, a distributed data storage service that is configured to perform event triggered transformations may support linked transformations. For example, instructions 202 may specify a sequence of transformations that are to be performed for data coming into or being made available from a particular storage location. For example, for incoming data a bucket access policy may specify that API 258 is to be invoked to perform a virus scan and subsequently API 252 is to be invoked to encrypt incoming data with a user defined encryption key.

In some embodiments, in addition to or in place of bucket access policies, an application program interface may be configured to accept objects leaving a particular storage location, such as one of buckets 220a or 220b, and may be linked to a directory of transformations to be applied to objects leaving the particular storage location that are destined for particular destination locations. For example, an API may accept object 224a from bucket 220a that is destined for bucket 220b. The API may be linked to a directory of transformations to be applied to objects that indicates API 256 is to be applied to all objects from bucket 220a destined for bucket 220b. The API may cause the object to pass from the directory of transformations API through API 256 before being made available at bucket 220b. In some embodiments, various other combinations of access policies, APIs, etc. may be used by a distributed data storage service to automatically perform transformations on data sets in response to triggering events.

FIG. 3 illustrates a provider network including a distributed data storage service configured to perform data transformations, and that includes additional services, according to some embodiments. FIG. 3 also illustrates a more detailed view of example destinations for transformed data, according to some embodiments. For example, storage service 340 illustrated in FIG. 3 may be the same storage service as storage service 140 illustrated in FIG. 1 or storage service 240 illustrated in FIG. 2.

In some embodiments, a distributed data storage service, such as any of the distributed data storage services described herein, may be included in a provider network of a service provider. The provider network may provide one or more other services to clients of the service provider network, such as compute services, networking services, etc., in addition to providing storage services.

In some embodiments, a client of a distributed data storage service, such as storage service 340, may submit instructions specifying one or more transformations to be performed for the client's data, such as instructions specifying one or more of the transformations stored in transformation depository 250 described in FIG. 2. The transformation may be applied to the client's data in response to certain triggering events. For example, a client or user may submit instructions specifying that objects (e.g., object 330a and/or 330b) made available from bucket 320a to destinations (e.g. bucket 320b) within the client's account with storage service 340 are to have a particular transformation applied when made available outside of bucket 320a. For example, a client may specify that transformation A 352 is to be applied when data from bucket 320a is made available within client account 342. A client may also submit instructions specifying that objects made available from bucket 320a to destinations within storage service 340 but outside the client's account are to have a different particular transformation applied when made available outside the client's account. For example, a client may specify that transformation B 354 is to be applied when data from bucket 320a is made available within storage service 340 but outside client account 342, for example at bucket 325 of Client B's account 344.

As another example, a client may submit instructions specifying that objects made available from bucket 320a to destinations such as other services within provider network 300 are to have one or more other particular transformations applied when made available outside of bucket 320a. For example, a client may specify that transformation C 356 is to be applied when data from bucket 320a is made available to additional service 360.

As yet another example, a client may submit instructions specifying that objects made available from bucket 320a to destinations outside of provider network 300 are to have one or more particular transformations applied when made available outside of bucket 320a. For example, a client may specify that transformation D 358 is to be applied when data from bucket 320a is made available, e.g., via intermediate network 380, to data consumers 370 outside of provider network 300.

In some embodiments, a distributed data storage service, such as storage service 340, may generate a pre-signed URL that can be provided to access data stored in the distributed data storage service. For example, a client of a distributed data storage service may provide a pre-signed URL generated by a distributed data storage service to a third party data consumer to allow the data consumer to access a view of the client's data. However, the client may not desire for the third party data consumer to be able to view raw data or all of the data stored for the client in a particular storage location. Instead, the client may desire data stored in the particular storage location be transformed in any of a number of ways before being made available to the third party data consumer. In such a situation, the client may submit instructions specifying that objects made available from a particular bucket, such as bucket 320a, via a particular URL, such as a pre-signed URL used by data consumers 370, are to have one or more particular transformations applied before being made available outside of bucket 320a. For example, a client may specify that transformation D 358 is to be applied when data from bucket 320a is made available to third party data consumers 370 outside of provider network 300 via a particular URL. In some embodiments, different transformations may be specified for different URLs.

In some embodiments, in which a transformation is associated with a particular URL, the transformation may be considered "ephemeral" meaning that the transformation is performed on a stream of data as the data is being read via the URL. However, the underlying data stored in the particular storage location, such as bucket 320a, may not be transformed. In some embodiments, for data that is read multiple times via a URL, a transformed version of the data may be cached for a threshold amount of time to improve efficiency of performing the transformation.

Figure 4A:
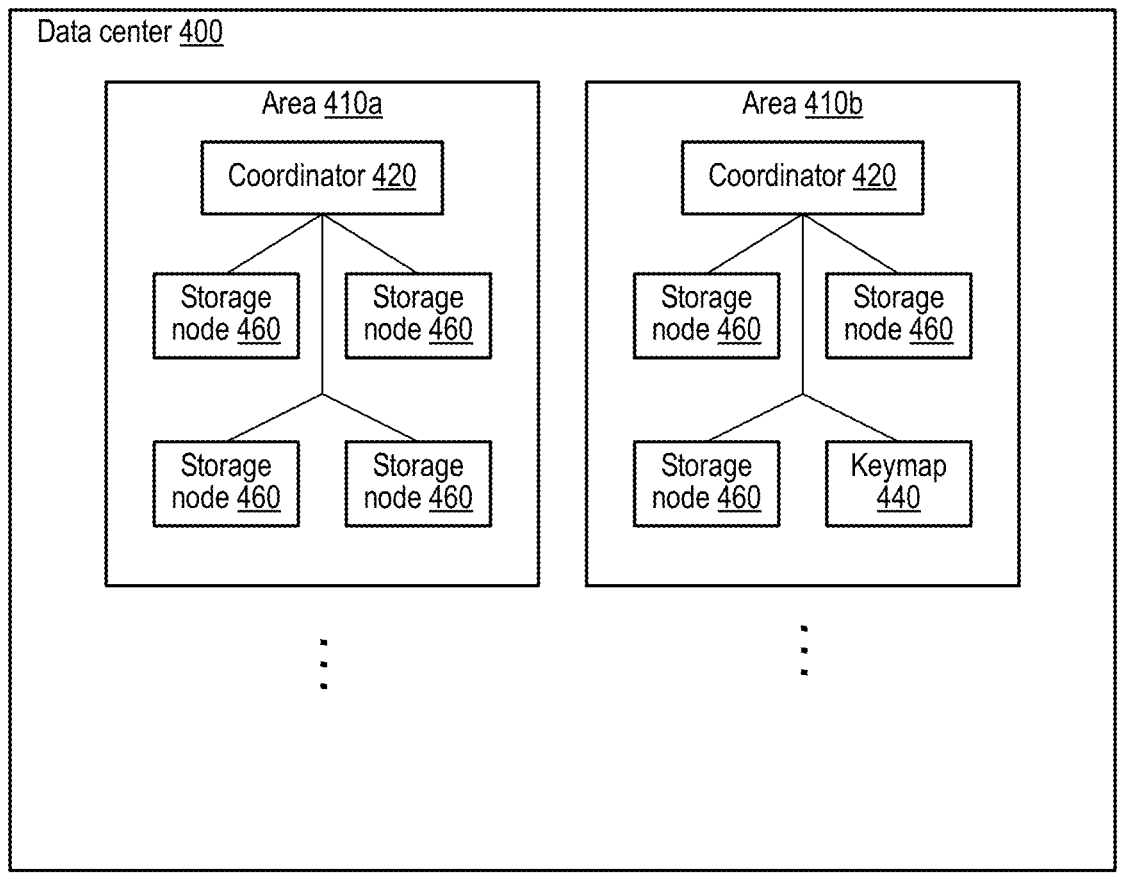
FIG. 4A illustrates a data center comprising hardware configured to at least partially implement a distributed data storage service configured to perform data transformations, according to some embodiments.
Figure 4B:
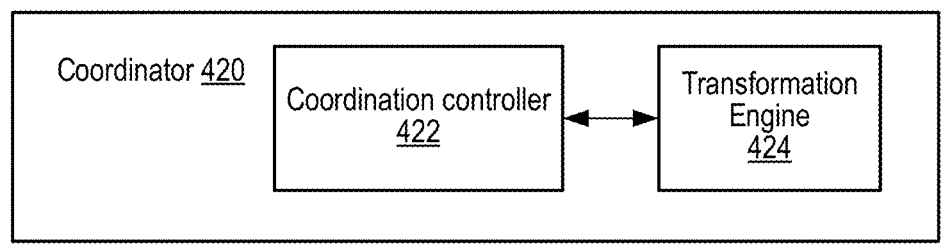
FIG. 4B illustrates a coordinator node comprising one or more transformation engines, according to some embodiments.
Figure 4C:
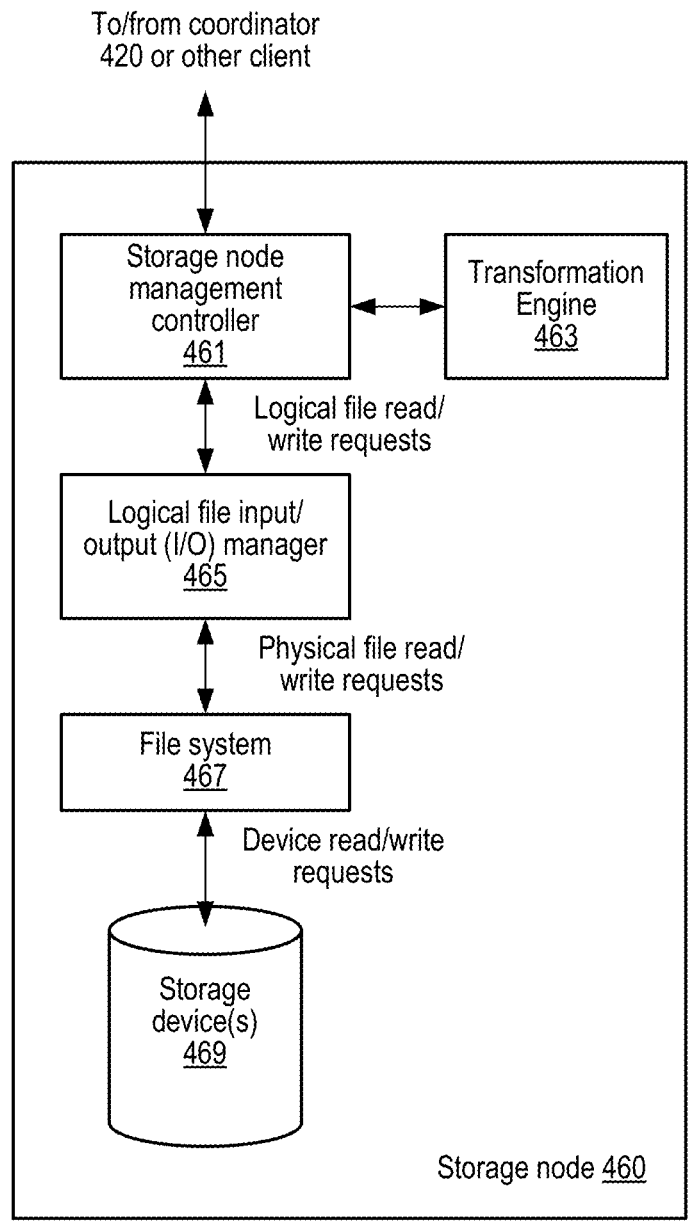
FIG. 4C illustrates a storage node comprising one or more transformation engines, according to some embodiments.

FIGS. 4A-4C illustrate an example hardware implementation of a distributed data storage service configured to perform data transformations, according to some embodiments. Any of the distributed data storage services described herein may be implemented on a hardware arrangement as described in FIGS. 4A-4C or may be implemented on other suitable hardware arrangements.

In the illustrated embodiment shown in FIG. 4A, a data center 400 is shown including two areas 410a-b. Each of areas 410a-b includes a respective coordinator instance 420a-b. Areas 410a-b may also include various combinations of storage nodes 460 and keymap instances 440, as well as other components. For example, area 410a includes four storage nodes 460, and area 410b includes three storage nodes 460 and a keymap instance 440.

In one embodiment each of areas 410a-b may be considered a locus of independent or weakly correlated failure. That is, the probability of any given area 410 experiencing a failure may be generally independent from or uncorrelated with the probability of failure of any other given area 410, or the correlation of failure probability may be less than a threshold amount.

Areas 410 may include additional levels of hierarchy (not shown). For example, in one embodiment areas 410 may be subdivided into racks, which may be further subdivided into individual nodes, such as storage nodes 460, although any suitable area organization may be employed. Generally speaking, areas 410 may include computing resources sufficient to implement the storage service system components deployed within the area. For example, each storage node 460 may be implemented as an autonomous computer system that may include a variety of hardware and software components. Similarly, each keymap instance 440 may be implemented via a number of computer systems. In addition to computing resources sufficient to implement the storage service system components deployed within the area, areas 410, may also include computing resources that implement one or more transformation engines. For example, as shown in FIG. 4B, a coordinator node, such as one of coordinator nodes 420 may further include computing resources that implement a transformation engine, such as transformation engine 424 along with other computing resources that implement a coordination controller 422. In some embodiments, a transformation engine may be implemented on a low-cost commodity processor included in a coordinator node to perform transformations. For example, in some embodiments, additional FPGA processors or ARM processors may be included in a coordinator node in addition to computing resources that that implement the storage service, such as computing resource that implement coordination controller 422, wherein the additional FPGA or ARM processors are configured to perform transformations. In some embodiments, computing resources included in an area, such as one of areas 410a or 410b may have excess capacity that is beyond a capacity sufficient to merely implement a storage service. In some embodiments, the excess capacity may be used to perform transformations. For example, in some embodiments, instead of including additional FPGA or ARM processors in a coordinator, such as coordinator 420, to perform transformations, processors that implement a coordinator controller, such as coordination controller 422, may be sized such that the processors also have capacity to implement a transformation engine, such as transformation engine 424.

Additionally, different storage service system components may communicate according to any suitable type of communication protocol. For example, where certain components of FIG. 1-3 are implemented as discrete applications or executable processes, they may communicate with one another using standard interprocess communication techniques that may be provided by an operating system or platform (e.g., remote procedure calls, queues, mailboxes, sockets, etc.), or by using standard or proprietary platform-independent communication protocols. Such protocols may include stateful or stateless protocols that may support arbitrary levels of handshaking/acknowledgement, error detection and correction, or other communication features as may be required or desired for the communicating components. For example, in one distributed data storage service embodiment, a substantial degree of inter-component communication may be implemented using a suitable Internet transport layer protocol, such as a version of Transmission Control Protocol (TCP), User Datagram Protocol (UDP) or a similar standard or proprietary transport protocol. However, it is also contemplated that communications among storage service system components may be implemented using protocols at higher layers of protocol abstraction.

FIG. 4C illustrates a storage node of a storage system of a distributed data storage service that comprises one or more transformation engines, according to some embodiments.

In an example hardware implementation, such as the hardware implementation described in FIGS. 4A-4B, storage nodes, such as storage nodes 460 may generally operate to provide storage for the various objects, e.g. objects 130, 230, 330, managed by the distributed data storage service, e.g. storage service 140, 240, 340 as described in FIGS. 1-3. One exemplary embodiment of a storage node 460 is shown in FIG. 4C. In the illustrated embodiment, storage node 460 includes a storage node management (SNM) controller 461 configured to interface with a transformation engine 463 and a logical file input/output (I/O) manager 465. Manager 465 is configured to interface with a file system 467, which is in turn configured to manage one or more storage devices 469. In various embodiments, any of SNM controller 461, transformation engine 463, logical file I/O manager 465 or file system 467 may be implemented as instructions that may be stored on a computer-accessible medium and executable by a computer to perform the functions described below. Alternatively, any of these components may be implemented by dedicated hardware circuits or devices.

In some embodiments, transformation engines may be included in storage nodes, as shown in FIG. 4C, may be included in coordinators, such as coordinator 420 as shown in FIG. 4B, or may be included in both. In some embodiments, storage node may include a transformation engine, such as transformation engine 463, at various levels within the storage node. For example, in some embodiments a transformation engine, such as transformation engine 463, may be included at a level such that the transformation engine interacts with logical file input/output (I/O) manager 465, or may be included at another level such that the transformation engine interacts with file system 467. In some embodiments, transformation engines may be included at other levels in place of or in addition to a transformation engine, such as transformation engine 463 as pictured in FIG. 4C, that is included at level such that the transformation engine interacts with storage node management controller 461. In some embodiments, file system 467 or logical file input/output (I/O) manager 465 may be omitted. For example, storage node controller 461 may interact with storage devices 469 directly or may interact with file system 467 directly.

In one embodiment, SNM controller 461 may be configured to provide an object storage API to a client of node 460 as well as to coordinate the activities of other components of node 460 to fulfill actions according to the API. For example, a controller 420 may be configured to store and retrieve objects to and from a given node 460 via the API presented by SNM controller 461. While API management is described herein as a feature of SNM controller 461, it is contemplated that in some embodiments, the API processing functions of node 460 may be implemented in a module or component distinct from SNM controller 461.

The object storage API may support object put, get and release operations. In one such embodiment, an object put operation, which may also be generically referred to as a store operation or a write operation, may specify the data and/or metadata of an object as an argument or parameter of the operation. Upon completion on a given node 460, a put operation may return to the requesting client a locator, also referred to herein as an object key which may be included in a keymap, corresponding to the stored object, which may uniquely identify the object instance on the given node 460 relative to all other objects stored throughout the storage service system.

Conversely, an object get operation, which may also be generically referred to as a read or retrieval operation, may specify a locator of an object, such as an object key of a key map, as a parameter. Upon completion, a get operation may return to the requesting client the object data and/or metadata corresponding to the specified locator.

In some embodiments, as part of performing an object get operation, a storage node controller, such as SNM controller 461, may ensure that one or more transformations are performed on the object prior to returning the object. The one or more transformations may be applied in accordance with a bucket access policy for a particular bucket in which the object is stored and may be performed by a transformation engine, such as transformation engine 462.

In the illustrated embodiment, logical file I/O manager 465 (or, simply, manager 465) may be configured to virtualize underlying device or file system characteristics in order to present to SNM controller 461 and transformation engine 462 one or more logically contiguous storage spaces in which objects may reside. For example, a given object may be located within a logical storage space according to its offset within the storage space and its extent from that offset (e.g., in terms of the object size, including data and metadata). By providing such a logical storage space, manager 465 may present a uniform view of underlying storage to SNM controller 461 regardless of the implementation details of such underlying storage.

In some embodiments, manager 465 may be configured to execute on multiple different execution platforms including different types of hardware and software. In some such embodiments, one or more additional layers of abstraction may exist between the logical object storage space presented by manager 465 to SNM controller 461 and its clients. For example, in the illustrated embodiment, manager 465 may be configured to implement the logical object storage space as one or more physical files managed by file system 467. Generally speaking, file system 467 may be configured to organize various types of physical storage devices 469 into logical storage devices that may store data in logical units referred to herein as physical files. Logical storage devices managed by file system 467 may be hierarchical in nature. For example, file system 467 may support a hierarchy of directories or folders that may be navigated to store and access physical files. Generally speaking, file system 467 may be configured to track and manage the relationship between a given physical file and the locations of storage devices 469 where corresponding data and/or metadata of the physical file are stored. Thus, in one embodiment, manager 465 may manage the mapping of the logical object storage space to one or more physical files allocated by file system 467. In turn, file system 467 may manage the mapping of these physical files to addressable locations of storage devices 469.

File system 467 may generally be integrated within an operating system, although any given operating system may support a variety of different file systems 467 that offer different features for management of underlying devices 469. For example, various versions of the Microsoft Windows® operating system support file systems such as the NT file system (NTFS) as well as the FAT32 (File Allocation Table-32) and FAT16 file systems. Various versions of the Linux and Unix operating systems may support file systems such as the ext/ext2 file systems, the Network File System (NFS), the Reiser File System (ReiserFS), the Fast File System (FFS), and numerous others. Some third-party software vendors may offer proprietary file systems for integration with various computing platforms, such as the VERITAS® File System (VxFS), for example. Different file systems may offer support for various features for managing underlying storage devices 169. For example, some file systems 467 may offer support for implementing device mirroring, striping, snapshotting or other types of virtualization features.

Generally speaking, storage devices 469 may include any suitable types of storage devices that may be supported by file system 467 and/or manager 465. Storage devices 469 may commonly include hard disk drive devices, such as Small Computer System Interface (SCSI) devices or AT Attachment Programming Interface (ATAPI) devices (which may also be known as Integrated Drive Electronics (IDE) devices). However, storage devices 469 may encompass any type of mass storage device including magnetic- or optical-medium-based devices, solid-state mass storage devices (e.g., nonvolatile- or "Flash"-memory-based devices), magnetic tape, etc. Further, storage devices 469 may be supported through any suitable interface type in addition to those mentioned above, such as interfaces compliant with a version of the Universal Serial Bus or IEEE 1394/Firewire® standards.

Example Provider Network Environment

Figure 5:
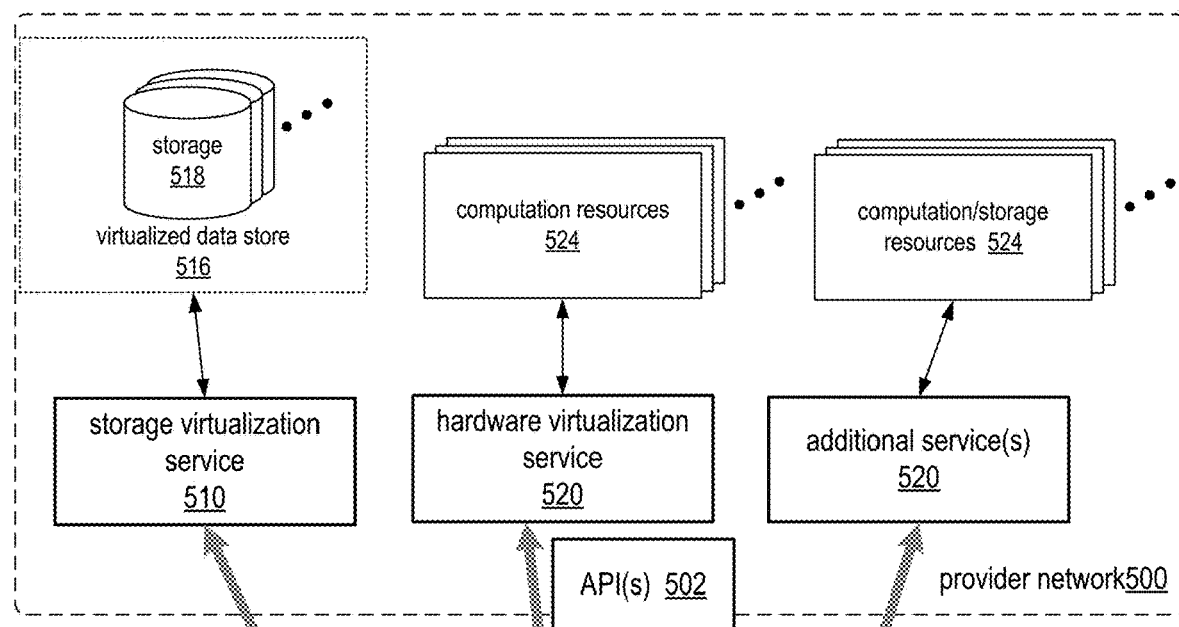
FIG. 5 is a block diagram of an example provider network that provides a distributed data storage service configured to perform data transformations, a hardware virtualization service, and one or more additional services, according to some embodiments.
Figure 5:
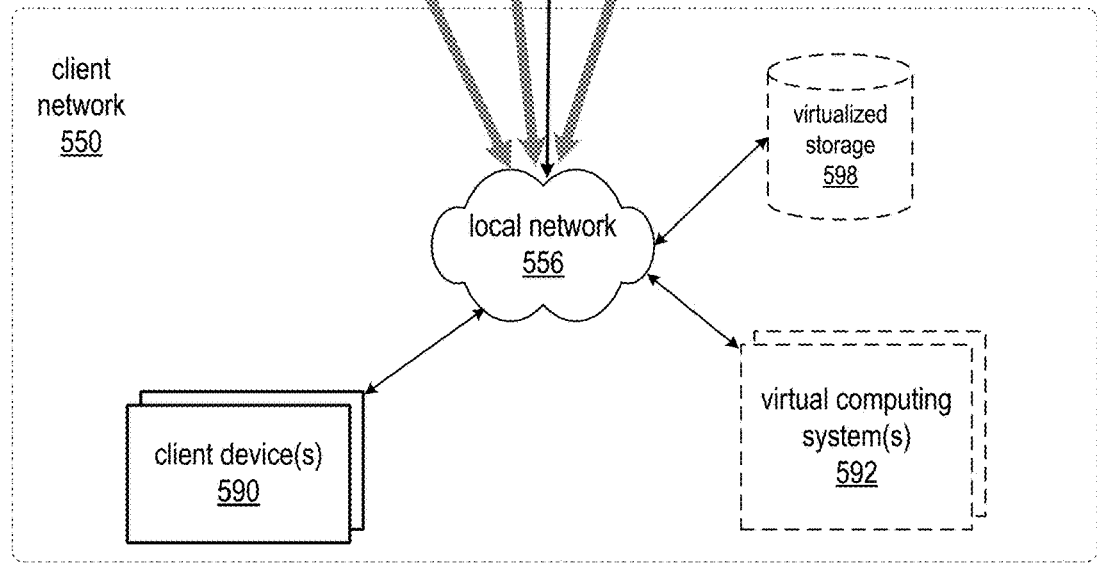

FIG. 5 is a block diagram of an example provider network that provides a distributed data storage service, a hardware virtualization service, and one or more additional services to clients, according to at least some embodiments. Hardware virtualization service 520 provides multiple computation resources 524 (e.g., VMs) to clients. The computation resources 524 may, for example, be rented or leased to clients of the provider network 500 (e.g., to a client that implements client network 550). Each computation resource 524 may be provided with one or more private IP addresses. Provider network 500 may be configured to route packets from the private IP addresses of the computation resources 524 to public Internet destinations, and from public Internet sources to the computation resources 524.

Provider network 500 may provide a client network 550, for example coupled to intermediate network 540 via local network 556, the ability to implement virtual computing systems 592 and/or virtualized storage 598 via hardware virtualization service 520 coupled to intermediate network 540 and to provider network 500. In some embodiments, hardware virtualization service 520 may provide one or more APIs 502, for example a web services interface, via which a client network 550 may access functionality provided by the hardware virtualization service 520. Also, a distributed data storage service included in the provider network 500 may include or more additional storage service interfaces, or may use a shared interface such as one or more of APIs 502. In at least some embodiments, at the provider network 500, each virtual computing system 592 at client network 550 may correspond to a computation resource 524 that is leased, rented, or otherwise provided to client network 550.

From an instance of a virtual computing system 592 and/or another client device 590, the client may access the functionality of distributed data storage service 510, for example via one or more APIs 502 or an interface of the distributed data storage service 510, to access data from and store data to, e.g., storage 518 of a virtualized data store 516 provided by the provider network 500.

While not shown in FIG. 5, the virtualization service(s) may also be accessed from resource instances within the provider network 500 via API(s) 502. For example, a client, appliance service provider, or other entity may access a virtualization service from within a respective private network on the provider network 500 via an API 502 to request allocation of one or more resource instances within the private network or within another private network.

Example Methods of Implementing Transformations in a Storage Service

Figure 6:
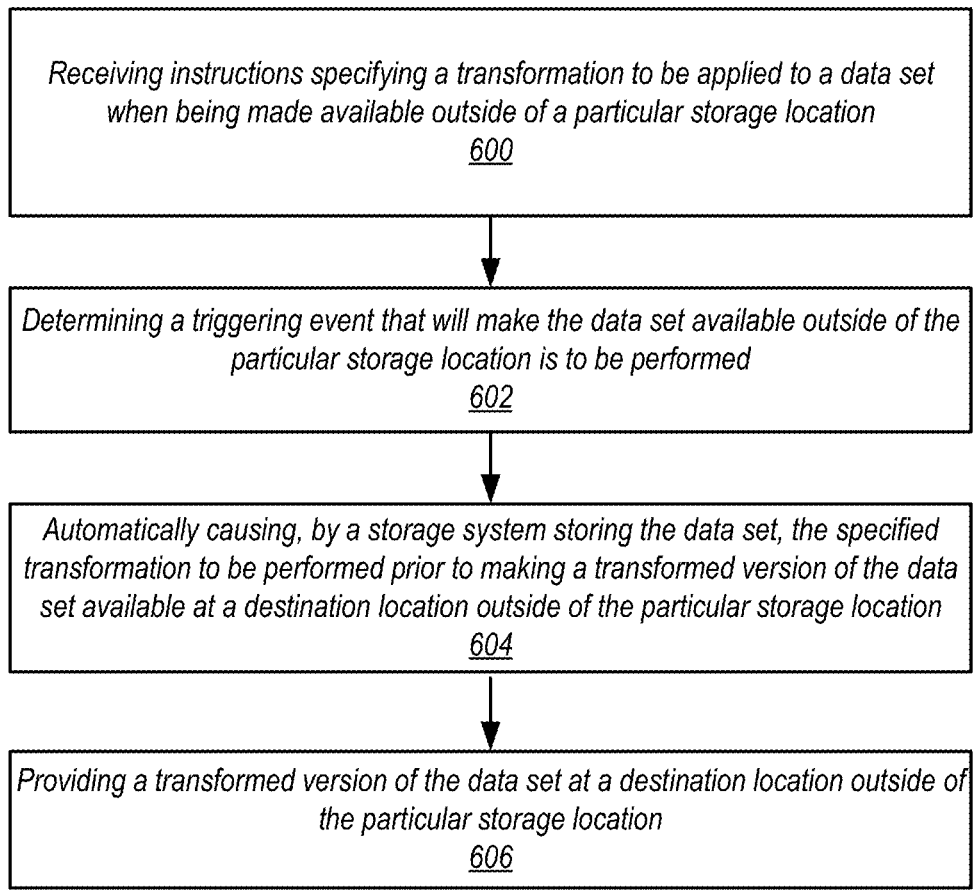
FIG. 6 is a flow diagram for implementing event triggered data transformations in a distributed data storage service, according to some embodiments.

FIG. 6 is a flow diagram for implementing event triggered data transformations in a distributed data storage service, according to some embodiments.

At 600 a distributed data storage service, such as any of the distributed data storage services described in FIGS. 1-5, receives instructions specifying one or more transformations that are to be applied to a data set, for example a data object, stored in a particular logical storage location, such as a bucket, when the data set, a portion of the data set, or a representation of the data set, is made available outside of the particular storage location. The instructions may be received via an interface of the distributed data storage service, such as a web interface, an API, or other type of interface. In some embodiments, a graphical user interface may be provided to a user of a distributed data storage service to allow a user to submit instructions specifying one or more transformations that are to be applied to one or more data sets. In some embodiments, a user may select one or more transformations from a set of pre-defined transformations offered by the distributed data storage service or may provide a user-defined transformation. In some embodiments, transformations may be stored in a transformation directory and user-defined transformations may be added to a transformation directory when received with the instructions. In some embodiments, user-defined transformations may be stored in a separate directory from a directory that stores pre-defined transformations. In some embodiments, the instructions may further specify one or more triggering events for which the specified transformation is to be applied. For example, the instructions may specify that when a data set is made available outside of a particular storage location or made available at a particular destination location one or more specified transformations are to be invoked prior to making the data set available outside of the particular storage location or at the particular destination location. Also, in some embodiments, the instructions may specify one or more transformations that are to be applied prior to data being added to a particular storage location. In some embodiments, the instructions may specify one or more classes of data objects for which the transformations are to be performed, regardless of whether or not the data sets are currently stored in the distributed data storage service. For example, instructions may specify that all documents including social security numbers are to have a transformation applied that removes the social security numbers from the documents. The transformation may be applied for any documents with social security numbers currently stored in the distributed storage service when the documents are made available outside of a particular storage location and/or the transformations may be applied to any documents that may be added to the distributed storage service in the future when the added documents are made available outside of a particular storage location. In some embodiments, a class of data objects may be defined by one or more characteristics of the data objects, such as contents of the data objects, an author of the data object, a creation date associated with the data object, a modification date associated with the data object, various other types of metadata associated with the data object, and the like.

At 602, it is determined that a triggering event will make a data set available outside of a particular storage location. For example, a triggering event may be moving a data set, copying a data set, making a data set available to be accessed via a URL, reading a data set, making a data set available for download, etc. In some embodiments, different transformations may be assigned to be invoked for different types of triggering events, for example a first transformation may be invoked for a data set that is to be made available via a URL and another transformation may be invoked if the data set is copied. Also different transformations may be invoked depending on a destination location of a data set resulting from a triggering event. For example different transformations may be invoked if a data set is to be made available within a client's account within a distributed data storage service than are invoked if the data set is to be made available outside of the client's account. Triggering events may be specified by clients of a distributed data storage system via instructions as described at 600.

At 604, in response to determining a triggering event will make the data set available outside of the particular storage location at which the data set is stored, the distributed data storage system causes one or more assigned transformations to be performed on the data set prior to the data set being made available outside of the particular storage location at a destination location. The transformations may be performed by hardware included in the distributed data storage service or may be performed by hardware outside of the distributed data storage service at the direction of the distributed data storage service. For example, from the perspective of a client of the distributed data storage service, the transformations may be automatically performed without intervention from the client once the transformations are assigned via the instructions as described at 600. Also, a data consumer of the transformed data may be aware that the data is being transformed prior to the data consumer receiving the transformed data.

At 606, a transformed version of the data set is made available at a destination location. As described in FIG. 2, transformed data may be made available at various destination locations and in some embodiments, transformations may be assigned based on destination location.

Figure 7:
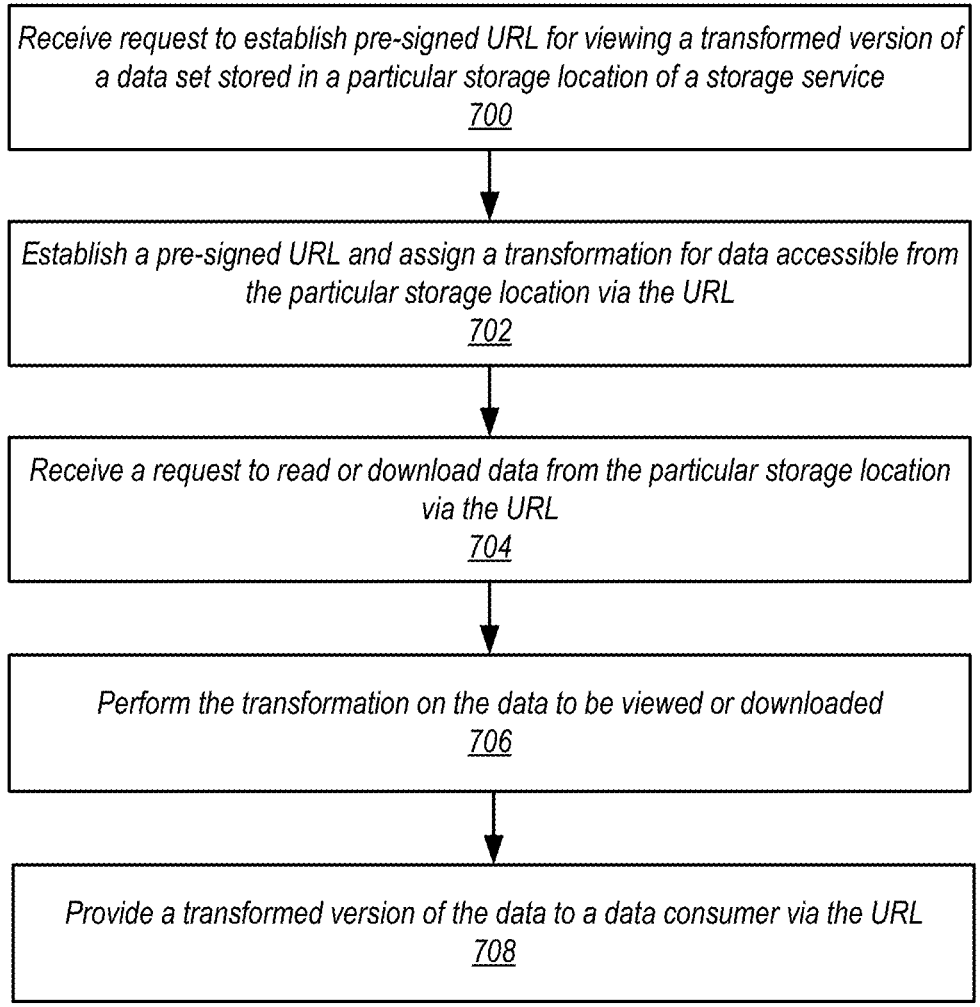
FIG. 7 is a flow diagram for implementing a feature for sharing transformed data using a pre-signed URL that provides transformed data from a particular storage location, according to some embodiments.

FIG. 7 is a flow diagram for implementing a feature for sharing transformed data using a pre-signed URL that provides transformed data from a particular storage location, according to some embodiments.

At 700 a request is received to establish a pre-signed URP for viewing data of a client of a distributed data storage service, such as data transformed by one or more transformations.

At 702, a pre-signed URL is established and a transformation is assigned to the pre-signed URL. The transformation may be indicated by the client of the distributed data storage service in the request to establish the pre-signed URL as described in 700 or may be specified in a separate set of instructions specifying one or more pre-defined or user-defined transformations that are to be applied to data accessed via the pre-signed URL. In some embodiments, data stored in more than one logical storage location may be accessed via the pre-signed URL and different transformations may be assigned to be applied to data sets stored in different logical storage locations that are accessed via the pre-signed URL.

At 704, a request to read or download data from a particular storage location associated with the pre-signed URL is received. At 706, one or more assigned transformations are performed on a data stream from the particular storage location made available via the pre-signed URL. From the perspective of a data consumer receiving data via the pre-signed URL the transformations may automatically take place without an indication that the data being read via the pre-signed URL is being transformed. At 708 the transformed data that has passed through the assigned one or more transformations is made available to a data consumer via the pre-signed URL. Also, from the perspective of a client of the distributed data storage service, transformations of data provided via a pre-signed URL may be performed automatically by a distributed data storage service without any interaction from the client subsequent to assigning a given one or more transformations to a pre-signed URL.

Illustrative Computer System

Figure 8:
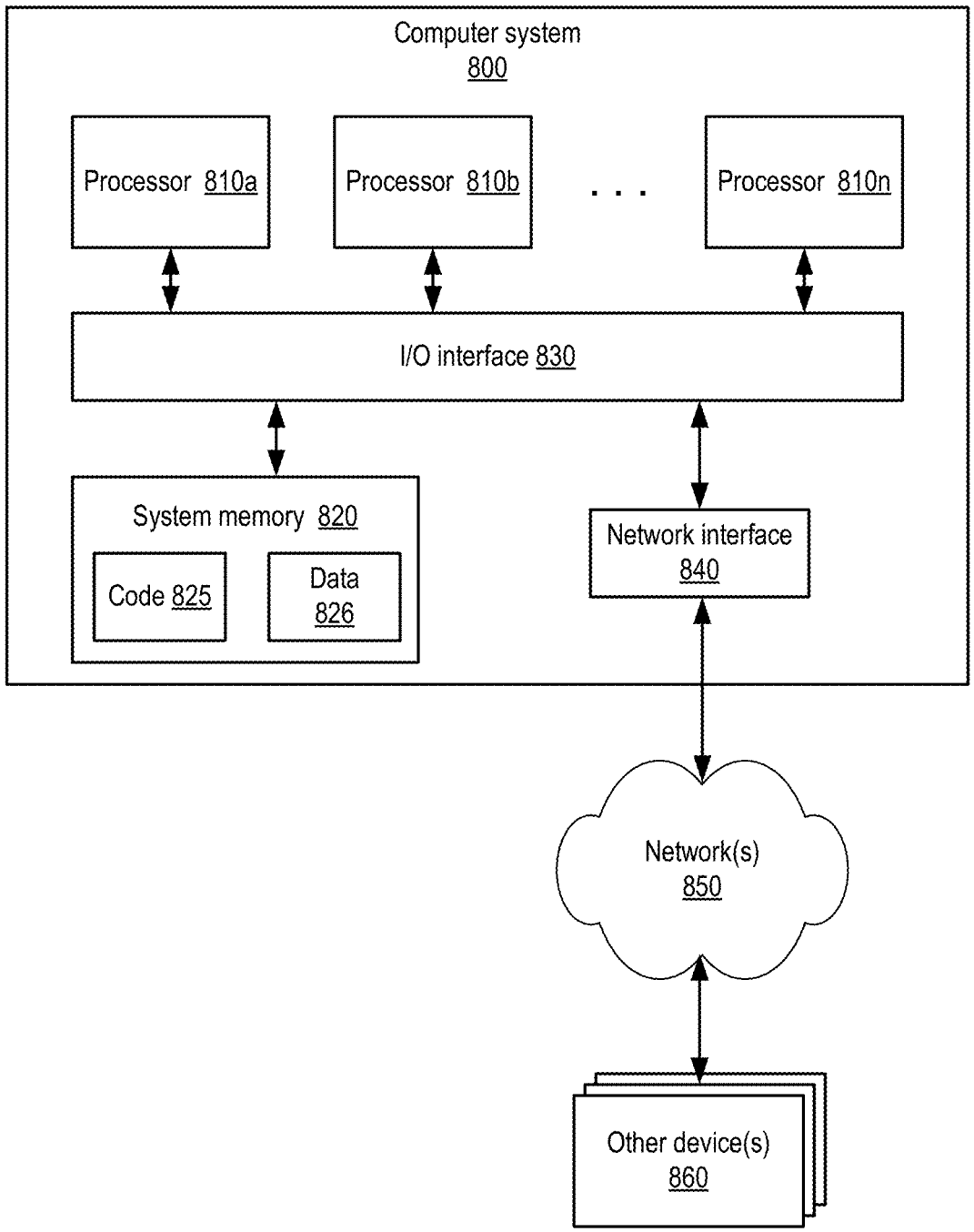
FIG. 8 is a block diagram illustrating an example computer system that may be used in some embodiments.

In at least some embodiments, a storage server, processing server, or other computer resource that implements a portion or all of the methods and apparatus described herein may include a computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for the methods and apparatus described herein, are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIGS. 1 through 7, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above for FIGS. 1 through 7 for implementing embodiments of methods and apparatus as described herein. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of physical storage devices configured to store data objects in storage buckets of an object-based storage virtualization service, for a plurality of clients of the object-based storage virtualization service; and
one or more computing devices configured to:
receive respective access policies for storage buckets allocated to particular clients of the plurality of clients of the object-based storage virtualization service, the storage buckets configured to store an arbitrary number of data objects, and each of the respective access policies specifying, for one or more respective storage buckets, at least,
a first type of transformation to be applied, based on a first destination location outside of a first one of the respective storage buckets, to a particular data object, wherein the particular data object is stored in the first respective storage bucket, wherein the first destination location for the particular data object is outside of a set of storage buckets associated with the particular client's account but is located in a storage bucket associated with a first other client's account inside the object-based storage virtualization service, and wherein application of the first type of transformation produces a first version of particular data that is to be made available at the first destination location, the first version of the particular data representing a transformed version of the particular data object transformed according to the first type of transformation; and
a second type of transformation to be applied, based on a second destination location outside of the first respective storage bucket, to the particular data object, wherein the second destination location for the particular data object is outside of the first respective storage bucket of the particular client and is located in a storage bucket associated with a second other client's account inside the object-based storage service or is located at a network location outside the object-based storage virtualization service, wherein application of the second type of transformation produces a second version of particular data that is to be made available at the second destination location, the second version of the particular data representing a transformed version of the particular data object transformed according to the second type of transformation, wherein different ones of the access policies are client selected and are configured to specify, for different respective ones of the storage buckets, different ones of one or more of:

the first destination location outside of the respective storage bucket;

the first transformation to be applied to data objects being made available at the first destination location;

the second destination location outside of the respective storage bucket; and the second transformation to be applied to data objects being made available at the second destination location; and in response to an event requesting data representing the particular data object be made available at a particular destination location outside of the first or other respective storage bucket that is one of the first or second destination location, automatically cause, according to a respective one of the received access policies and based on the particular destination location, a transformation having a corresponding one of the first or second type of transformation specified by the respective access policy, to be performed on the particular data object to produce a corresponding one of the first or second version of the particular data subsequently made available at the particular destination location outside of the first or other respective storage bucket.

2. The system of claim 1, wherein the event requesting data representing the transformed version of the particular data object be made available outside of the first or other respective storage bucket comprises at least one of:

a request to copy the particular data object to another logical storage location in the storage virtualization service;

a request to store the particular data object to another logical storage location in the storage virtualization service or to a location outside of the storage virtualization service;

a request to read the particular data object; or a request to download the particular data object from the object-based storage virtualization service.

3. The system of claim 1, wherein the transformation is defined by a client of the object-based storage virtualization service or selected by a client of the object-based storage virtualization service from a set of available transformations.

4. The system of claim 1, wherein the object-based storage virtualization service is configured to cause the transformation to be performed by one or more processors that are proximate to a physical location at which the particular data object is stored.

5. The system of claim 4, wherein the processors comprise application specific integrated circuits (ASICs) configured to perform the transformation, field programmable gate arrays (FPGAs) configured to perform the transformation, or reduced instruction set computer (RISC) processors located proximate to respective ones of the physical storage devices and configured to perform the transformation.

6. A method, comprising:

receiving an access policy for a storage bucket from a client of a storage virtualization service of a provider network configured to store a plurality of data sets in a plurality of storage buckets, the storage buckets configured to store an arbitrary number of data sets, and the access policy for the storage bucket specifying, a first type of transformation to be applied, based on a first destination location outside of the storage bucket, to a particular data set, wherein the particular data set is stored in the storage bucket, and wherein the storage buckets is allocated to an account of the client, the account comprising one or more storage buckets, wherein the first destination location for the particular data set is outside of the one or more storage buckets of the client's account but inside the provider network, and wherein application of the first type of transformation produces a first version of particular data that is to be made available at the first destination location outside of the storage bucket, the first version of the particular data representing a transformed version of the particular data set transformed according to the first type of transformation; and a second type of transformation to be applied, based on a second destination location outside of the storage bucket, to the particular data set, wherein the second destination location is a network location inside or outside the provider network that is different than the first destination location, wherein application of the second type of transformation produces a second version of particular data that is to be made available at the second destination location, the second version of the particular data representing a transformed version of the particular data set transformed according to the second type of transformation;

in response to an event requesting the data representing the transformed version of the particular data set be made available at a particular destination location outside of the storage bucket that is one of the first or second destination location, automatically performing, according to the received access policy for the storage bucket and based on the particular destination location, a transformation having a corresponding one of the first or second type of transformation specified by the access policy, on the particular data set to produce a corresponding one of the first or second version of the data representing the transformed version of the particular data set, prior to making the data representing the transformed version of the particular data set available at the particular destination location outside of the storage bucket; and providing a consumer of the particular data set a pre-signed Uniform Resource Locator (URL) comprising credentials for accessing the data representing the transformed version of the particular data set during a defined time window, wherein the consumer of the particular data set reads or downloads the data representing the transformed version of the particular data set via the pre-signed URL.

7. The method of claim 6, further comprising:

making the data representing the transformed version of the particular data set available outside of the storage bucket, wherein said making the data available comprises:

making a copy of the particular data set to be stored in another storage bucket of the storage virtualization service; or moving storage of the particular data set to another storage bucket of the storage virtualization service.

8. The method of claim 7, wherein the other storage bucket of the storage virtualization service is allocated to a different client than a client to which the storage bucket is allocated.

9. The method of claim 6, further comprising making the data representing the particular data set available outside of the storage bucket, wherein said making the data available comprises:

preparing a representation of the transformed version of the particular data set to be downloaded from the storage virtualization service.

10. The method of claim 6, wherein the access policy for the storage bucket specifying the first or second type of transformation, specifies characteristics of data sets, not yet stored in the storage bucket, for which a corresponding transformation having the first or second type of transformation is to be applied.

11. The method of claim 6, wherein the transformation is performed by another service, wherein the storage virtualization service coordinates with the other service to automatically perform the transformation.

12. The method of claim 6, wherein the storage virtualization service comprises a plurality of application program interfaces (APIs) each associated with a different type of transformation, and wherein the access policy specifying the type of transformation to be applied for the particular data set, specifies one or more particular APIs that are to be used to transform the particular data set when made available at one or more respective particular locations outside of the storage bucket.

13. The method of claim 12, wherein said performing the transformation comprises:

performing a first transformation, via a given one of the APIs, for a first data set at a first location; and performing a second transformation, via another one the APIs, for a second data set at a second location, wherein the first transformation and the second transformation are different transformations.

14. The method of claim 6, wherein the transformation comprises a transformation defined by a client of the storage virtualization service.

15. The method of claim 6, further comprising:

receiving, by the storage virtualization service, a data storage policy specifying one or more other transformations to apply for a given data set prior to the given data set being stored in a given storage bucket of the storage virtualization service; and performing, by the storage virtualization service, the one or more other transformations prior to storing the given data set in the given storage bucket.

16. A non-transitory computer-readable storage medium storing program instructions that, when executed by a computing device of a storage virtualization service, cause the computing device to:

receive an access policy for a storage bucket from a client of the storage virtualization service, the storage bucket configured to store an arbitrary number of data sets, and the access policy for the storage bucket specifying, a first type of transformation to be applied, based on a first destination location outside of the storage bucket, to a particular data set, wherein the particular data set is stored in the storage bucket that is allocated to an account of the client, wherein the first destination location is outside of the client's account but inside the provider network, and wherein application of the first type of transformation produces a first version of particular data that is to be made available at the first destination location, the first version of the particular data representing a transformed version of the particular data set transformed according to the first type of transformation; and a second type of transformation to be applied, based on a second destination location outside of the storage bucket, to the particular data set, wherein the second destination location for the particular data set is outside of the storage bucket at which the particular data set is stored, wherein the second destination location is a network location inside or outside the provider network that is different than the first destination location, wherein application of the second type of transformation produces a second version of particular data that is to be made available at the second destination location, the second version of the particular data representing a transformed version of the particular data set transformed according to the second type of transformation;

in response to an event requesting the data representing the particular data set be made available at a particular destination location outside of the storage bucket that is one of the first or second destination location, automatically cause, according to the received access policy for the storage bucket and based on the particular destination location, a transformation having a corresponding one of the first or second type of transformation specified by the access policy, to be performed on the particular data set to produce a corresponding one of the first or second version of the particular data subsequently made available at the particular destination location outside of the storage bucket; and provide a consumer of the particular data set a pre-signed Uniform Resource Locator (URL) comprising credentials for accessing the data representing the transformed version of the particular data set during a defined time window, wherein the consumer of the particular data set reads or downloads the data representing the transformed version of the particular data set via the pre-signed URL.

17. The non-transitory computer-readable storage medium of claim 16, wherein the program instructions when executed by a computing device of the storage virtualization service, further cause the computing device to:

store one or more user-defined transformations, wherein said cause the transformation to be performed comprises causing the stored one or more user-defined transformation to be performed.

18. The non-transitory computer-readable storage medium of claim 16, wherein the storage virtualization service comprises a plurality of pre-defined transformations, and wherein the access policy specifies one or more of the pre-defined transformations, wherein said cause the transformation to be performed comprises causing the specified one or more pre-defined transformation to be performed.

19. The non-transitory computer-readable storage medium of claim 16, wherein the program instructions when executed by a computing device of the storage virtualization service, further cause the computing device to:

associate the transformation with the Uniform Resource Locator (URL), wherein said cause the transformation to be performed comprises causing the transformation to be performed when the particular data set is accessed via the URL.

\* \* \* \* \*